J. F. O'CONNOR.
LOCOMOTIVE AND TENDER CONNECTION.
APPLICATION FILED JULY 15, 1916.
1,225,163.
Patented May 8, 1917.
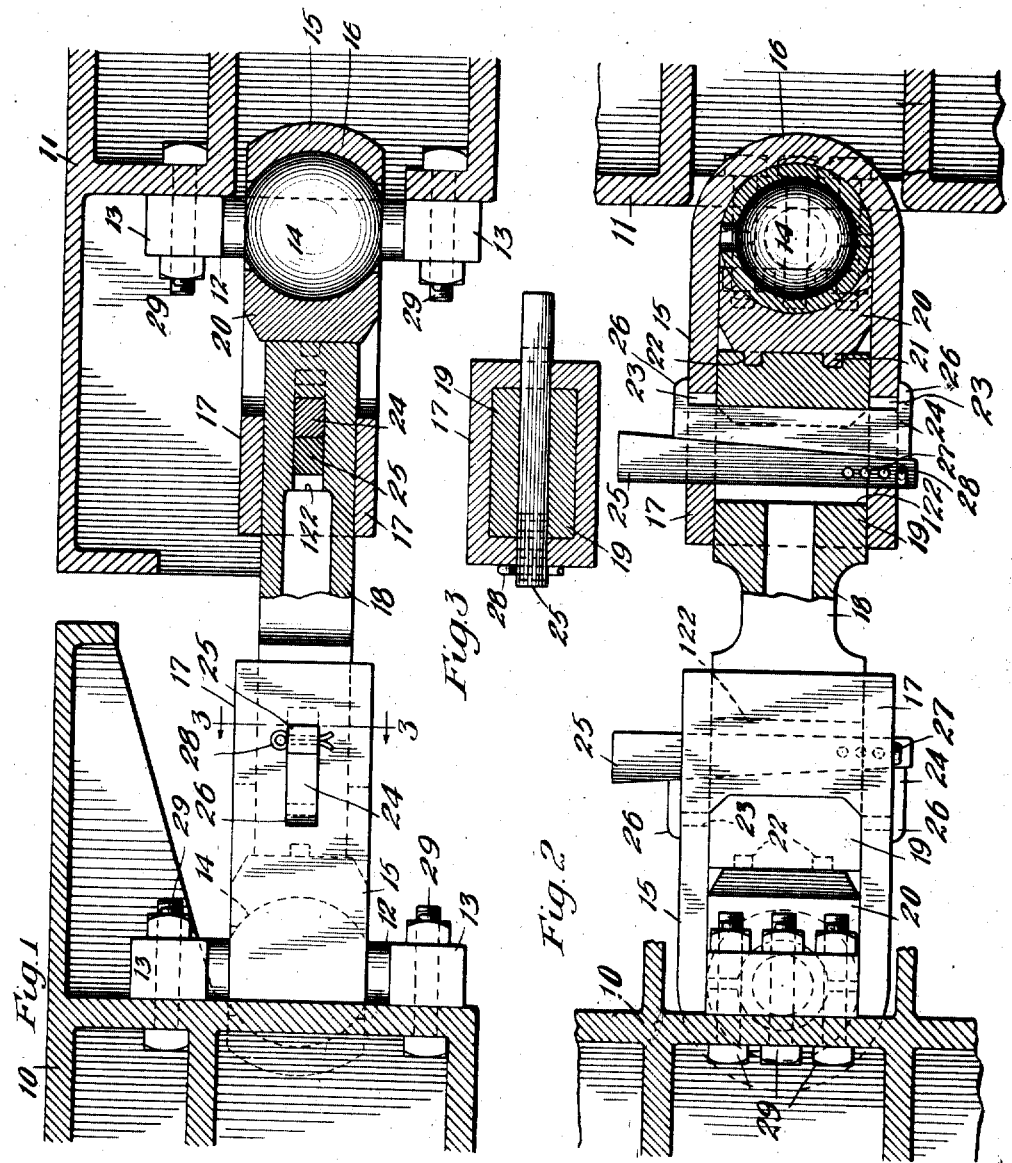
WITNESSES:
INVENTOR.
John F. O'Connor
BY George I Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

LOCOMOTIVE AND TENDER CONNECTION.

1,225,163. Specification of Letters Patent. Patented May 8, 1917.

Application filed July 15, 1916. Serial No. 109,420.

*To all whom it may concern:*

Be it known that I, JOHN F. O'CONNOR, a citizen of the United States, residing at Chicago, in the county of Cook and State of Illinois, have invented a certain new and useful Improvement in Locomotive and Tender Connections, of which the following is a full, clear, concise, and exact description, reference being had to the accompanying drawings, forming a part of this specification.

This invention relates to improvements in locomotive and tender connections.

Objects of the invention are to provide a shackle of substantial form for connecting a locomotive and its tender, which shackle shall be capable of vertical and horizontal or universal movements; which is provided with means for taking up wear or lost motion; which is readily applied and detached; and which obviates the necessity for the now commonly used chafe castings.

In the drawing forming a part of this specification, Figure 1 is a longitudinal, vertical sectional view illustrating portions of a locomotive and tender with my improvements applied thereto, part of the improved connecting means being shown in side elevation and part in section. Fig. 2 is a part horizontal section, part top plan of the structure illustrated in Fig. 1. And Fig. 3 is a transverse, vertical sectional view taken on the line 3—3 of Fig. 1.

In said drawing, 10 denotes a portion of the under-frame of a locomotive and 11 an adjacent portion of the locomotive tender and by which the two are connected as hereinbefore described. The improved connection comprises a shackle having a universal joint connection with both the locomotive and the tender. As shown, said shackle or connection includes at each end, a vertical bar 12 having rectangular, heavy ends 13—13 and a substantially spherical center 14; a loop or yoke 15 at each end of the shackle, each loop or yoke 15 having a U-shaped outer end 16 curved to fit the spherical portions 14 and hollow, rectangular inner end 17; and a central bar or link 18 having rectangular ends 19 fitting within the hollow hoods or heads 17. Interposed between each rectangular end 19 of the connecting bar 18 and corresponding spherical section 14 is a bearing plate 20 curved to fit the spherical section on one side and having tongues 21 on the opposite side fitting in corresponding grooves or recesses 22 formed in the end face of the bar 18. Each end of the bar 18 is transversely slotted as indicated at 122 and the side walls of each rectangular head 17 are also slotted as indicated at 23, and extending through said slots is a tapered key 24 and coöperating tapered wedge 25. Each key 24 is flanged at its ends as indicated at 26 to over-lap the side walls of the loop member to thereby prevent lateral displacement of the key. Each wedge 25 is provided at its narrow end with a series of perforations 27 to receive a cotter 28 or other retaining device. The vertical bars or members 12 are preferably detachably connected to the respective parts of the locomotive and tender by a series of bolts 29—29.

From the preceding description, it will be seen that a universal joint is provided between each member 12 and the connection extending therebetween, thus accommodating all relative vertical and lateral movements between the locomotive and tender. In addition to the foregoing, by means of the tapered keys and wedges, the connection between the central bar 18 and the respective loops or yokes 15 can be adjusted as desired to take up slack or wear on the parts. Furthermore, the entire shackle may be readily applied or disconnected, or any of the parts may be easily replaced. It is obvious that the tender and locomotive may also be readily disconnected by simply removing one of the sets of keys and wedge. Furthermore, the wearing surfaces between the connector and the spherical sections are large, thus minimizing the rate of wear.

Although I have herein shown and described what I now consider the preferred means of carrying out my invention, it will be understood that the same is merely illustrative and that various changes and modifications may be made in the parts without departing from the spirit of the invention.

I claim:

1. In a locomotive and tender connection, the combination with members rigid with respect to the locomotive and tender respectively, said members having each a central, spherical section, and means for connecting said members, said means including a loop at each end thereof curved to fit over the corresponding spherical section, and a removable bearing block within each loop fitting the outer side of the corresponding spherical section.

2. In a device of the character described, the combination with two end members each having a spherical central section, of a connection between said members, said connection including a loop at each end and a removable bearing block within each loop.

3. In a locomotive and tender connection, a shackle, the shackle comprising two end loop members and a central connecting bar, of means for connecting said loop members to the locomotive and tender respectively, and means for adjustably connecting said bar with each of said loop members, respectively.

4. In a locomotive and tender connection, the combination with two end members adapted to be rigidly attached to a locomotive and tender respectively, each of said members having a spherical section, of a shackle extending between said members, said shackle comprising two end loop members and an intermediate connecting bar, the loop members having a universal joint connection with each of said first named members, and the connecting bar being adjustably connected with each of the loop members.

5. In a device of the character described, the combination with two end members each adapted to be attached to a locomotive or tender, of a connection between said members, said connection including a loop at each end encircling one of said members, and a removable bearing block within each loop engaging the outer side of said member.

6. In a locomotive and tender connection, a shackle, said shackle comprising two end loop members and a central connecting bar, means for connecting said loop members to the locomotive and tender respectively, and means for adjustably connecting said bar with one of said loop members.

7. In a locomotive and tender connection, a shackle comprising two end loop members each of which is provided with a hollow hood, the hoods being disposed opposite each other, and a central connecting bar extending between said loops, the ends of said bar being seated within said hollow hoods, and detachable connections between each hood and the respective end of said bar.

In witness that I claim the foregoing I have hereunto subscribed my name this 13th day of July 1916.

JOHN F. O'CONNOR.

Witnesses:
GOLDIE A. BISHOP,
ELIZABETH M. BRITT.